W. W. BLAKELY.
SECURING DEVICE FOR ARTICLES.
APPLICATION FILED JAN. 26, 1918.
1,303,456.                                    Patented May 13, 1919.
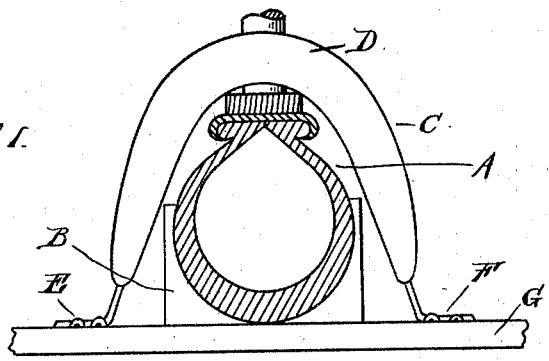
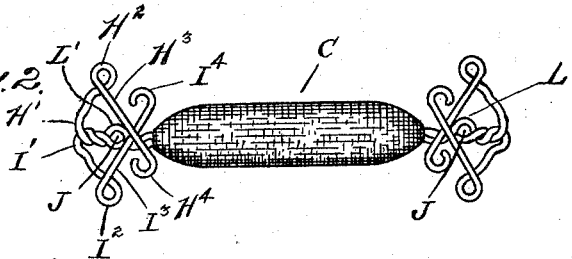
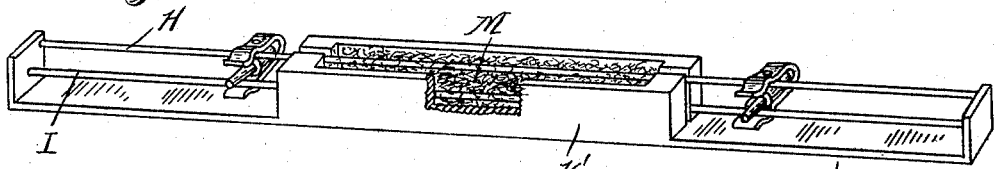
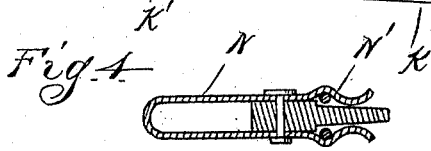
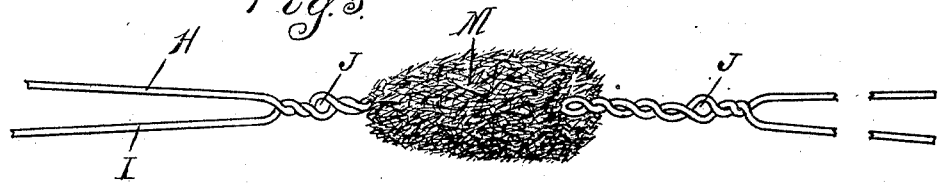
Inventor
William W. Blakely
By Whittemore Hulbert & Whittemore
Attorneys

UNITED STATES PATENT OFFICE.

WILLIAM W. BLAKELY, OF DETROIT, MICHIGAN.

SECURING DEVICE FOR ARTICLES.

1,303,456.  Specification of Letters Patent.  Patented May 13, 1919.

Application filed January 26, 1918. Serial No. 213,969.

*To all whom it may concern:*

Be it known that I, WILLIAM W. BLAKELY, a citizen of the United States of America, residing at Detroit, in the county of Wayne and State of Michigan, have invented certain new and useful Improvements in Securing Devices for Articles, of which the following is a specification, reference being had therein to the accompanying drawings.

This invention relates to an improved securing device for articles such as are used in securing automobiles or other articles in place during shipment and to other similar devices such as handles and holders of various kinds.

One of the objects of the invention is to provide an improved securing device which can be used for holding automobiles or other articles in place during shipment, although the invention is not limited to the particular use specified.

The invention also resides in the provision of a securing device which can be manufactured at relatively low cost and in such features of construction and arrangements and combinations of parts as will more fully hereinafter appear.

In the drawings:

Figure 1 is a fragmentary sectional view showing the device employed for holding the wheel of an automobile;

Fig. 2 is a top plan view of the securing device;

Fig. 3 is a perspective view showing the first step in the manufacture;

Fig. 4 is an enlarged sectional view through one of the clips;

Fig. 5 is a view showing the partly completed device.

Describing first the article with reference to its use for holding an automobile in place while being shipped, A designates one of the wheels of the automobile and B the block for preventing forward movement of the wheel. For holding the wheel from vertical movement I employ the securing device C which has a central or body portion D looped over the felly of the wheel and has its opposite ends E and F nailed to the floor G. The securing device is so formed that a plurality of bearing or securing portions are arranged at spaced points, the entire construction being preferably formed from two wires having their ends bent and provided at the central portions with a fabric or other textile covering twisted into or interlocked with the wire. The detailed arrangement of the end portions is as follows. Near each end the wires H and I are bent as follows: The wire H is first bent at $H'$ rearwardly toward the opposite end and then is looped at $H^2$ from which there projects a diagonally extending portion $H^3$ terminating in a loop $H^4$. The wire H is similarly bent, but in a reverse direction to provide a return-bent portion $I'$ having a loop $I^2$, and a diagonally extending portion $I^3$ terminating in a loop $I^4$. The loops $I^2$ and $I^4$ and $H^2$ and $H^4$ form four bearing or securing portions through which nails, staples or the like can be driven, while in addition to these loops a further loop J is formed in the twisted portion L and $L'$, this last loop being preferably formed during the twisting. The central body portion D is formed of cotton waste or other textile material M which is interlocked with the wires H and I.

While the invention is not limited to any particular method of forming the article I have illustrated in Fig. 3 one of the first steps in manufacturing the article which comprises laying the wire H in the bottom of the holder K and then filling the box $K'$ with cotton waste or other textile material M. The wires are then engaged by clip members N having the spring clips $N'$ for holding the wires in spaced relation with the cotton waste clamped therebetween. The article is then placed in a lathe or other suitable turning device and the twisted portions L and $L'$ formed. Whenever the holding device N is withdrawn it leaves the loops J through which one of the nails or other securing members can be driven. The ends of the wires are then bent to provide the return-bent portion and loops $I'$, $I^2$, etc. and the article preferably curved to the form shown in Fig. 1.

By twisting the wire in the manner above described the cotton waste is tightly interlocked with the twisted portions of the wire and forms a soft body portion which will not injure the article held, while the wires extending through the central part give the necessary strength to the holder.

While I have mentioned cotton waste as the padding material it is obvious that other substances could be employed and various forms and shapes of metallic strips employed. Also in place of forming but one loop J near each end of the device, a plurality of clips could be used at each end and when withdrawn leave a plurality of loops J which could, if desired, form the sole fastening means.

Various other changes in the details of construction and material used can be made within the scope of my invention.

What I claim as my invention is:—

1. A securing device for articles comprising a main body portion formed of padding material and a metal member interlocked with said material, having portions projecting beyond said padding material to form fastening means.

2. A securing device for articles comprising a main body portion formed of padding material and a metal member interlocked with said material, said metal member having return-bent ends arranged to provide a pair of spaced loops or securing portions at each end.

3. A securing device for articles comprising a body portion formed of two wires each having its opposite ends return-bent, and provided with two loops to form a plurality of spaced bearings or securing portions at each end.

4. A securing device for articles, comprising a body portion formed of two wires twisted together, each wire terminating in a return-bent portion, the return-bent portion having a loop from which extends a diagonal portion terminating in a loop.

5. A securing device for articles comprising a body portion formed of two wires twisted together, each wire terminating in a return-bent portion, each return-bent portion having a loop from which extends a diagonal portion terminating in a loop, the last-mentioned loop being positioned nearer the center of the securing device than the first-mentioned loop.

6. A securing device for articles comprising a main body portion formed of padding material, a pair of twisted wires interlocked with said padding material and having projecting portions forming a securing means.

In testimony whereof I affix my signature.

WILLIAM W. BLAKELY.

Copies of this patent may be obtained for five cents each, by addressing the "Commissioner of Patents, Washington, D. C."